July 1, 1958 M. B. GOETZ 2,841,217
ABSORBENT REGENERATOR AND THERMAL RECIRCULATOR
AND METHOD OF OPERATING SAME
Filed Jan. 27, 1956
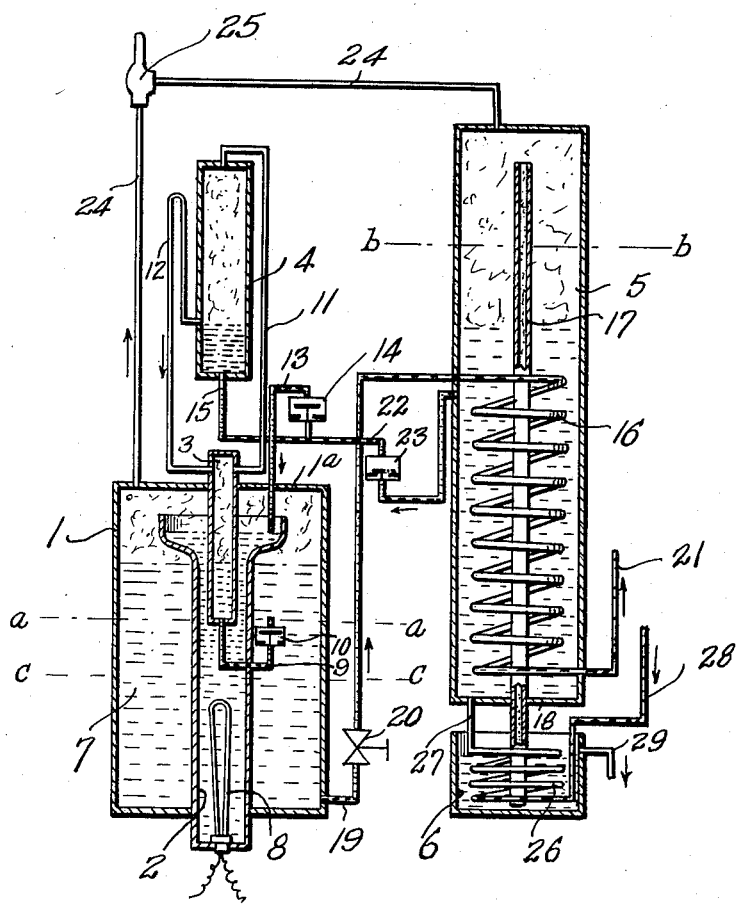
INVENTOR
MICHAEL BERNARD GOETZ
BY
HIS ATTORNEY United States Patent Office 2,841,217
Patented July 1, 1958

2,841,217

ABSORBENT REGENERATOR AND THERMAL RECIRCULATOR AND METHOD OF OPERATING SAME

Michael Bernard Goetz, Frederick, Md.

Application January 27, 1956, Serial No. 561,842

10 Claims. (Cl. 159—22)

This invention relates to an apparatus and a method for receiving and regenerating moisture diluted hygroscopic fluid, and for pumping the regenerated fluid or concentrate to a dehumidifying apparatus, utilizing heat alone as a medium for both regeneration and recirculation of said fluid.

This application is a continuation in part of my prior application filed April 23, 1954, Serial Number 425,249, now Patent Number 2,769,313, entitled "Hygroscopic Air Conditioner," and more particularly constitutes an improvement in the regenerator and the thermal circulator disclosed therein.

An important object of this invention is the production of a method to regenerate, or concentrate, water diluted hygroscopic fluid by boiling said fluid in a generator to which heat is applied, and to recover most of the sensible and latent heat of regeneration by means of a heat interchanger which utilizes the said recovered heat to partially regenerate said dilute hygroscopic fluid before it enters said generator, in turn cooling the concentrate flowing to a dehumidifying apparatus.

Another object of this invention is the production of a method to utilize the source of heat applied to a generator to continuously pump a concentrate by means of the pressure in the generator into a dehumidifying apparatus, while intermittently returning the dilute fluid to the generator by utilizing an auxiliary chamber submerged in the boiling fluid of the generator, alternately filling the auxiliary chamber by gravity at low pressure with dilute fluid and emptying the auxiliary chamber by gravity into the generator at high pressure, by means of check valves and a vacuum or syphon chamber.

Other objects and advantages of the present invention will appear throughout the following description and claims.

In the drawing:

The figure is a diagrammatic view of the apparatus employed in carrying out the method herein described.

The apparatus illustrated in the accompanying drawing consists of a generator 1, a make-up chamber 3, a vacuum chamber 4, an interchanger 5, and a condensate pan 6, all interconnected to form a complete regenerator and thermal recirculator.

The generator 1 comprises in the present instance, a cylindrical pressure vessel or container, preferably vertically disposed, and constitutes an outer chamber 7, and an inner chamber 2, also termed a heating zone, enclosed within the walls of the outer chamber 7 of the generator 1. This inner chamber 2 is preferably vertically disposed and extends through the bottom of the generator 1 up into the outer chamber 7, and comprises a cylindrical vessel having an open upper end, which open upper end terminates short of the top wall 1ᵃ of the generator 1. The inner chamber or heating zone 2 is in communication with the outer chamber 7 through the open top or upper end of the inner chamber 2. A heating element, such as electric immersion heater 8, is enclosed within the walls of the inner chamber 2. It should be understood, however, that any suitable means for supplying heat to said generator may be used, if desired.

The make-up chamber 3 comprises in this instance a cylindrical pressure vessel, preferably vertically disposed, partially enclosed within the inner chamber 2 and extending through the top wall 1ᵃ of the generator 1, thence downward into the inner chamber 2, and terminating at approximately midway of the height of the generator 1. The extreme lower portion of the make-up chamber 3 communicates with the outer chamber 7 of the generator 1 through the conduit 9, which includes a check valve 10. This check valve 10 is arranged to check flow from the outer chamber 7 of the generator 1 to the make-up chamber 3.

The vacuum chamber 4 comprises in this instance a cylindrical pressure vessel, preferably vertically disposed adjacent to and at a higher level than the generator 1. This vacuum chamber 4 communicates with the make-up chamber 3 through a venting conduit 11, and a syphon loop 12. The venting conduit 11 forms a communication between the extreme upper portion of the make-up chamber 3 and the extreme upper portion of the vacuum chamber 4. The syphon loop 12 forms a communication between the upper portion of the make-up chamber 3 and the lower portion of the vacuum chamber 4, short of the bottom of the vacuum chamber 4. The vacuum chamber 4 communicates with the inner chamber 2 of the generator 1 through the conduit 13 which includes a check valve 14 arranged to check flow from said inner chamber 2 to the vacuum chamber 4 and through the conduit 15, which conduit 15 communicates with the bottom of the vacuum chamber 4.

The interchanger 5 comprises in this instance a cylindrical vessel or shell preferably vertically disposed and extending upwardly and above the extreme upper level of the vacuum chamber 4. A vertical coil or other heat transfer means 16 is enclosed within the walls of the interchanger 5. A vertical conduit 17 also is enclosed within the walls of the interchanger 5. This vertical conduit 17 extends through the bottom wall 18 of the interchanger 5 and the upper end of the vertical conduit 17 terminates short of the upper end of the interchanger 5, as shown.

The upper end of the vertical coil 16 communicates with the extreme lower portion of the generator 1 through a conduit 19, which includes a valve 20, or other means to regulate flow. The lower end of the coil 16 communicates with a nozzle, or other distributing means in a dehumidifying apparatus, not shown on the drawing but which may be connected to the conduit 21. The shell of the interchanger 5 communicates with the extreme lower portion of the vacuum chamber 4 from a point in the shell of the interchanger 5 at approximately the level of the top of the interchanger coil 16, through the conduit 22 and through the conduit 15. A check valve 23 is carried by the conduit 22 and is arranged to check flow from the vacuum chamber 4 to the interchanger 5. A conduit 24 forms a communication between the extreme upper portion of the interchanger 5 and the extreme upper portion of the generator 1. A pressure relief valve 25 is carried by the conduit 24.

The condensate pan 6 comprises an open cylindrical vessel enclosing within its walls a vertical heat transfer coil 26, or other heat transfer means. The upper end of the coil 26 communicates with the extreme lower portion of the interchanger 5 through a conduit 27. The lower end of the coil 26 communicates with a sump of a dehumidifying apparatus, not shown on the drawing, through a conduit 28. The sump must be located at a higher level than the interchanger 5. The condensate pan 6 communicates with a suitable drain from its extreme upper portion through an overflow conduit 29 and the condensate pan 6 communicates with the interchanger 5 through vertical conduit or venting conduit 17. This conduit 17 terminates at its lower end just short of the bottom of the pan 6, as is shown in the drawing.

The drawing shows the system charged with a hygroscopic fluid. The cycle of operation is started by the application of heat to the fluid within the inner chamber 2 of the generator 1, by means of the heating element 8. Heat is transmitted to the fluid in the make-up chamber 3, and also to the fluid in the outer chamber 7 of the generator 1, bringing both fluids to a boil and concentrating the fluid by removing some of the water vapor contained therein. The vapor pressure increases in both vessels and the make-up chamber 3 empties by gravity into the generator 1, through conduit 9 and check valve 10, while concentrate flows out of the generator 1 through conduit 19. The vapor pressure in the make-up chamber 3 is transmitted to the vacuum chamber 4 (which is in heat transfer relationship with the atmosphere), through conduits 11 and 12. Some of the water vapor in said vacuum chamber 4 condenses due to cooling effect of the atmosphere. The vapor pressure in said vacuum chamber 4 being the same as that in the generator 1, the fluid lying in the lower portion of the vacuum chamber 4, below the outlet to the syphon loop 12, flows by gravity through conduits 15 and 13, and check valve 14, into the inner chamber 2 of the generator 1. This replaces the small amount of fluid which has boiled out of the inner chamber 2, to maintain a proper full level in the inner chamber 2. Any excess will overflow into the outer chamber 7. The vapor formed in the generator flows out through the conduit 24 and the pressure relief valve 25. The pressure in the vacuum chamber 4 communicating through the conduit 22 closes the check valve 23.

When the fluid level in the outer chamber 7 of the generator falls to line a—a, the make-up chamber 3 will be empty and boiling ceases in the make-up chamber 3, but continues in the generator 1 and concentrate continues to flow out of the generator 1, the level falling to line c—c. The remaining water vapor occupying the vacuum chamber continues to condense, thereby reducing the pressure in the make-up chamber 3, and in the vacuum chamber 4, and the higher pressure in the generator 1 causes the check valve 10 to close.

Hot concentrate flowing from the generator 1 through the conduit 19 passes through the coil 16, then to the dehumidifying apparatus, not shown, through the conduit 21. Water vapor flowing from the generator 1, through the conduit 24, and the relief valve 25 flows into the shell of the interchanger 5, thence downward through the venting conduit 17, condensing on contact with water in the condensate pan 6.

Cool dilute hydroscopic fluid from the dehumidifying apparatus, not shown, flows by gravity through the conduit 28, through the coil 26, thence upward into the shell of the interchanger 5, through the conduit 27, flowing over the coil 16 and raising the level in the interchanger 5 to a level indicated by the line b—b. The upstream through the coil 26 becomes heated by the condensing vapor in the condensate pan 6, and the upstream through the shell of said interchanger 5 becomes further heated by the downstream flow of concentrate through the coil 16, the concentrate in turn being cooled. This causes some water vapor to be discharged from solution in the dilute fluid, partially concentrating the fluid. The water vapor along with the vapor from the generator 1 passes through the venting conduit 17 to the condensate pan 6. It is apparent from the above description that the coil 16 of the interchanger 5 constitutes a heat donating zone, and the area outside of the coil within the shell is a heat receiving zone.

When, as set forth above, the boiling ceases in the make-up chamber 3, and condensation in the vacuum chamber 4 reduces the pressure below atmospheric pressure, the partially concentrated fluid in the shell of the interchanger 5 will flow through the conduit 22 and check valve 23 into the chamber 4, filling the vacuum chamber 4. When the level in the vacuum chamber 4 reaches that of the top portion of the syphon loop 12, the fluid will syphon into the make-up chamber 3, thereby re-filling the make-up chamber 3.

The heat from the generator 1 now causes the fluid in the make-up chamber 3 to boil, and the pressure increase causes the check valve 23 to close thereby checking the flow from the interchanger 5. When the temperature, and hence the pressure, of the fluid in the make-up chamber 3 reaches that of the fluid in the generator 1, this fluid will again flow from the make-up chamber 3, through the check valve 10, and the cycle will repeat itself.

Thus, it will be seen that the apparatus will deliver a continuous stream of concentrate to said dehumidying apparatus, and return a continuous stream of dilute fluid from the dehumidifying apparatus. The returning fluid intermittently fills the make-up chamber 3, then empties the make-up chamber into the generator 1.

By virtue of an interchange of heat between the returning cool dilute fluid and both the hot concentrate and the hot vapor from the generator, the concentrate will be delivered relatively cool to the dehumidifying apparatus and fluid will be delivered relatively warm, and partially concentrated to the generator.

The advantages of the invention are:
(1) It is simple in operation and construction.
(2) It is inexpensive to construct.
(3) It has no mechanical or electrical mechanism to get out of order.
(4) It is highly efficient, recovering most of the sensible and latent heat of regeneration.
(5) It will operate with any liquid hygroscopic agent.
(6) It requires no communication to the outside except a drain connection to carry off the condensed water or other vapor.

It should be noted that the present invention relates to an apparatus, method and system for accomplishing the purposes set forth in the above description.

What is claimed as new is:

1. A system for continuous regeneration of a diluted absorbent returning by gravity from an absorber and for continuous delivery of the concentrated absorbent to the means of distribution within said absorber comprising a generator containing an inner chamber, a make-up chamber partially enclosed within said inner chamber communicating with and supplying partially diluted absorbent to said generator, a check valve controlling said supply, a heating means for supplying heat to the contents of both the generator and said inner chamber, a vacuum chamber adjacent to and at a higher level than said make-up chamber communicating with and supplying partially diluted absorbent to said make-up chamber, a syphon interposed between said make-up chamber and said vacuum chamber, said vacuum chamber also communicating with and supplying partially diluted absorbent to said inner chamber, a check valve interposed between the vacuum chamber and said inner chamber, an interchanger comprising an outer enclosure and an inner coil in heat transfer relationship with the contents of said outer enclosure, the outer enclosure communicating with and receiving vapor from said generator, a relief valve controlling the admission of vapor to said outer enclosure, said outer enclosure communicating with and supplying warm partially concentrated absorbent to said vacuum chamber, a check valve controlling the supply of absorbent to said vacuum chamber, said inner coil communicating with and receiving hot concentrate from said generator, said inner coil adapted to communicate with and adapted to supply concentrate to said absorber, a condensate containing pan, a second coil in heat transfer relationship with the contents of said condensate pan, said condensate pan enclosing said second coil, said condensate pan communicating with and receiving vapor from said interchanger and communicating with and supplying condensed vapor through an overflow, said second coil in said condensate pan communicating with and supplying warmed dilute absorbent to said outer enclosure of said interchanger and adapted to communicate with and receive cool dilute absorbent by gravity from said absorber.

2. An apparatus of the class described, comprising a generator, a vacuum chamber located at a higher level than said generator, a gravity feed conduit forming communication between said vacuum chamber and said generator, an interchanger, conduits connecting said generator to said interchanger, said interchanger comprising a means of recovering a portion of the sensible heat absorbed in concentrated liquid flowing from said generator, to preheat dilute liquid returning by gravity from an absorber which is adapted to communicate with said interchanger, and said interchanger also comprising a means of recovering a portion of the latent heat of vaporization absorbed in the vapor leaving said generator to preheat said dilute liquid, and an outlet control adapted to permit automatic one direction flow of said dilute liquid from said interchanger to said vacuum chamber.

3. An apparatus as defined in claim 2, wherein a means forming a heating chamber is associated with said generator, and said apparatus includes a means forming a liquid make-up chamber associated with said heating chamber, a venting means between said make-up chamber and said vacuum chamber, a syphon connection between said make-up chamber and said vacuum chamber, and an outlet control adapted to permit automatic one direction flow of liquid from said make-up chamber into the interior of said generator.

4. An apparatus as defined in claim 2, wherein a means forming a heating chamber is associated with said generator, and said apparatus includes a means forming a liquid make-up chamber associated with said heating chamber, a venting means between said make-up chamber and said vacuum chamber, a syphon connection between said make-up chamber and said vacuum chamber, and an outlet control adapted to permit automatic one direction flow of liquid from said vacuum chamber to said heating chamber.

5. An apparatus of the class described comprising a generator having an outer chamber and an inner chamber, a make-up chamber within said inner chamber, a vacuum chamber mounted at a higher elevation above said generator, an interchanger comprising an interchanger vessel, a heat transfer means within said interchanger vessel, a condensate vessel open at its upper end and located below said interchanger vessel, a second heat transfer means in said condensate vessel, said second heat transfer means communicating with the lower end of said interchanger vessel, communicating means interposed between the upper end of said first mentioned heat transfer means and said outer chamber, the lower end of said first mentioned heat transfer means being adapted to connect to a dehumidifying apparatus, the lower end of said second heat transfer means being adapted to connect to the sump of a dehumidifying apparatus, a control means forming a communication with said interchanger vessel at a point approximately the level of the top of said first mentioned heat transfer means and the bottom of said vacuum chamber, check control means forming a communication between said vacuum chamber and the top of said inner chamber, means for heating said inner chamber, check control means forming a communication between said outer chamber and said make-up chamber, means forming a communication between said make-up chamber and the upper end of said vacuum chamber, a second means forming a communication between the vacuum chamber near its lower portion with the upper end of said make-up chamber, means forming a communication between the upper end of said interchanger vessel and the upper end of said outer chamber of said generator, and a conduit forming a communication between said condensate vessel and the upper portion of said interchanger vessel all in a manner to utilize heat alone as a medium for both regeneration and recirculation of fluid within said apparatus.

6. A method of forcing a continuous flow of a liquid under pressure out of a pressure vessel, comprising continuously heating and boiling said liquid in said pressure vessel to produce said pressure, and intermittently returning by gravity to said pressure vessel an amount of make-up liquid equal to the amount flowing out of said pressure vessel, by alternately filling a make-up chamber with said make-up liquid at low pressure, and emptying said make-up chamber into said pressure vessel by gravity at high pressure, and by alternately filling a vacuum chamber with said make-up liquid under a partial vacuum, and partially emptying said vacuum chamber by syphoning said make-up liquid into said make-up chamber; the method also comprising continuously applying heat to said pressure vessel and to said make-up chamber, and continuously removing heat from said vacuum chamber, the high pressure in said make-up chamber being produced when liquid is contained therein, by heating and boiling said liquid, the low pressure in said make-up chamber being induced when said make-up chamber has emptied of boiling liquid by cooling and condensing vapor in said vacuum chamber, which communicates with said make-up chamber through a syphon and vent; the cooling and condensing of vapor in said vacuum chamber reducing the pressure therein to a partial vacuum thereby inducing make-up liquid to be sucked into said vacuum chamber, thus raising the liquid level in said vacuum chamber above said syphon, whereupon the vacuum chamber quickly empties to the level of the open end of said syphon into the make-up chamber.

7. A method of continuous regeneration of dilute absorbent comprising heating and boiling dilute absorbent within a generator to concentrate said absorbent and to produce pressure and force the concentrate to flow to an absorber through a heat donating zone of a heat interchanger, the concentrate becoming diluted in said absorber, then allowing the dilute absorbent from said absorber to flow by gravity into a heat receiving zone of said interchanger, then inducing said dilute absorbent to flow by vacuum into a vacuum chamber, said vacuum being produced by condensation of vapor in said vacuum chamber, then inducing a portion of dilute absorbent to flow from the vacuum chamber into a make-up chamber by syphonic action; and partially concentrating said dilute absorbent in said make-up chamber, thereby increasing the pressure therein, thus equalizing said pressure with that in said generator and thereby allowing said absorbent to flow by gravity from said make-up chamber into said generator, said equalizing of said pressure and said concentrating of said dilute absorbent resulting from boiling the dilute absorbent by the application of heat to said make-up chamber by means of a heating zone in heat transfer relationship with said make-up chamber and with said generator.

8. A method as defined in claim 7, wherein vapor produced by the boiling of said dilute absorbent in the generator flows through a pressure controlling means into said interchanger, and flows through a conduit enclosed within the heat receiving zone of said interchanger to a condensate pan, wherein said vapor condenses to recover the latent heat of vaporization, condensation resulting from the absorbtion of heat from said vapor by cooler fluid flowing to said heat receiving zone of said interchanger through a heat transfer means enclosed within the condensate pan, said cooler fluid comprising dilute absorbent adapted to flow from an absorber to said heat transfer means.

9. A method as defined in claim 7, wherein said heating zone, comprising a chamber containing highly concentrated absorbent and heated by a heat source, is enclosed within said generator, and wherein, during the period of the cycle when the pressure in said make-up chamber, and hence in said vacuum chamber which communicates therewith through a syphon and said vent, is equal to the pressure in said generator and hence to the pressure in said heating zone which communicates therewith through its open upper end, the portion of dilute absorbent remaining in the bottom of said vacuum chamber and unaffected by said syphonic action, flows by gravity into said heating zone through an outlet control adapted to permit automatic one direction flow, thereby replacing absorbent that might have evaporated out of said heating zone due to the heating of the absorbent contained therein, any excess absorbent overflowing into the generator.

10. A method as defined in claim 7, wherein the flow of the concentrate from said generator to an absorber through said interchanger is continuous, and wherein the flow of the dilute absorbent from said interchanger to said vacuum chamber is intermittent and controlled automatically by the partial vacuum induced in said vacuum chamber by condensation of vapor therein, and the flow of the dilute absorbent from said vacuum chamber into said make-up chamber is intermittent and controlled automatically by syphonic action when the absorbent flowing into said vacuum chamber rises to a level which initiates syphonic action, and the flow of the dilute absorbent from said make-up chamber into said generator is intermittent and controlled automatically by the said equalization of the pressures in the make-up chamber and the generator created by the boiling of the dilute absorbent in said make-up chamber.

References Cited in the file of this patent

UNITED STATES PATENTS

| | | |
|---|---|---|
| 1,887,000 | Wooten et al. | Nov. 8, 1932 |
| 2,321,115 | Thomas | June 8, 1943 |
| 2,631,018 | Kals | Mar. 10, 1953 |